(12) United States Patent
Satomi et al.

(10) Patent No.: US 7,313,624 B2
(45) Date of Patent: *Dec. 25, 2007

(54) METHOD AND SYSTEM FOR PROVIDING AN ON-LINE SERVICE AND COMPUTER READABLE STORAGE MEDIUM

(75) Inventors: Shigeki Satomi, Yokohama (JP); Taku Seki, Yokohama (JP)

(73) Assignee: Hitachi, Ltd., Tokyo (JP)

(*) Notice: Subject to any disclaimer, the term of this patent is extended or adjusted under 35 U.S.C. 154(b) by 507 days.

This patent is subject to a terminal disclaimer.

(21) Appl. No.: 10/962,586

(22) Filed: Oct. 13, 2004

(65) Prior Publication Data

US 2005/0060415 A1 Mar. 17, 2005

Related U.S. Application Data

(63) Continuation of application No. 09/625,982, filed on Jul. 26, 2000, now Pat. No. 6,823,389.

(30) Foreign Application Priority Data

Sep. 7, 1999 (JP) ................................. 11-252471

(51) Int. Cl.
*G06F 15/16* (2006.01)
(52) U.S. Cl. ..................... 709/227; 709/219; 709/249; 455/422.1; 726/4
(58) Field of Classification Search ........ 709/217–219, 709/227–229, 249; 713/155–156, 182; 726/2–4; 455/422.1, 456.3, 457, 517
See application file for complete search history.

(56) References Cited

U.S. PATENT DOCUMENTS

| 5,701,412 | A | 12/1997 | Takeda et al. |
| 5,774,668 | A | 6/1998 | Choquier et al. |
| 5,948,061 | A | 9/1999 | Merriman et al. |
| 6,112,305 | A | 8/2000 | Dancs et al. |
| 6,115,611 | A | 9/2000 | Kimoto et al. |
| 6,122,358 | A | 9/2000 | Shoji et al. |
| 6,128,485 | A | 10/2000 | Mori et al. |
| 6,154,777 | A | 11/2000 | Ebrahim |
| 6,173,332 | B1 | 1/2001 | Hickman |
| 6,385,651 | B2 | 5/2002 | Dancs et al. |

(Continued)

FOREIGN PATENT DOCUMENTS

JP 7226797 8/1995

(Continued)

*Primary Examiner*—Bharat Barot
(74) *Attorney, Agent, or Firm*—Mattingly, Stanger, Malur & Brundidge, P.C.

(57) ABSTRACT

In an online service providing system, a user PC can receive services without paying attention to business hours and line identifier numbers of service points. Automatic distributor device exists between PC issuing a service request and a plurality of service points offering services and passes the service request of PC to pertinent service point. Access authorization level DB stores information regarding each user. Service point DB stores business time zones of respective service points. Automatic distributor device refers to access authorization level DB to determine an authorization level of the user. Moreover, automatic distributor device references service point DB to select service point currently in the business time zone and relays communication to PC.

7 Claims, 10 Drawing Sheets

U.S. PATENT DOCUMENTS

| | | |
|---|---|---|
| 6,606,304 B1 | 8/2003 | Grinter et al. |
| 6,823,389 B1 * | 11/2004 | Satomi et al. .............. 709/227 |
| 7,031,665 B1 * | 4/2006 | Trell ....................... 455/422.1 |
| 2007/0162973 A1 * | 7/2007 | Schneier et al. .............. 726/22 |

FOREIGN PATENT DOCUMENTS

| | | |
|---|---|---|
| JP | 7253948 | 10/1995 |
| JP | 1093717 | 4/1998 |
| JP | 9-826559 | 6/1998 |
| JP | 10-078931 | 9/1998 |
| JP | 11-4305 | 1/1999 |
| JP | 11212936 | 8/1999 |

\* cited by examiner

FIG.3

16 ACCESS AUTHORIZATION LEVEL DB

| CALL ID (31) | USER ID | REGISTRATION FLAG (33) | AVAILABLE SERVICE TYPE CODE (34) |
|---|---|---|---|
| 044-555-5555 | 10000001 | 1 | 11,12 |
| 03-1111-1111 | 10000213 | 1 | 11,12 |
| — | 10000214 | 0 | 11,12 |
| ⋮ | ⋮ | ⋮ | ⋮ |
| — | 20000755 | 0 | 21,22,23 |
| 045-777-7777 | 20000756 | 1 | 21,22,23 |
| ⋮ | ⋮ | ⋮ | ⋮ |

FIG.4

17 SERVICE POINT DB

| SERVICE POINT NAME (41) | BUSINESS HOURS (42) | AVAILABLE SERVICE TYPE CODE (43) | TRANSFERABLE SERVICE TYPE CODE (44) | SERVICE POINT NO. (45) |
|---|---|---|---|---|
| A | 8:00~16:00 | 11,12,22 | 12 | 0120-111111 |
| B | 16:00~24:00 | 21,22,23,12 | 12 | 0120-222222 |
| C | 0:00~8:00 | 11,12 | 12 | 0120-333333 |
| D | 12:00~20:00 | 11,21,22,23 | — | 0120-444444 |
| E | 20:00~4:00 | 12,21,22 | — | 0120-555555 |

FIG.5

15 POINT OPERATION STATUS TABLE

| SERVICE POINT NAME (46) | OPERABLE FLAG (47) | END FLAG (48) |
|---|---|---|
| A | 1 | 0 |
| B | 1 | 1 |
| C | 1 | 1 |
| D | 1 | 0 |
| E | 0 | 1 |

FIG.6

18 HISTORY DB

| CALL ID (51) | USER ID (52) | RELAY DESTINATION SERVICE POINT NAME (53) | RELAY CONNECTION START TIME (54) | RELAY CONNECTION END TIME (55) | TIME USED (56) |
|---|---|---|---|---|---|
| 011-123-4567 | 10000101 | B | 17:24 | 17:55 | 0:31 |
| 0422-11-1111 | 20000202 | B | 18:00 | 18:05 | 0:05 |
| 0423-22-2222 | 10000511 | D | 19:40 | 19:55 | 0:15 |
| 06-111-1111 | 20000345 | E | 2:13 | 3:15 | 1:02 |
| 022-111-1111 | 20000202 | A | 6:45 | 7:15 | 0:30 |

METHOD AND SYSTEM FOR PROVIDING AN ON-LINE SERVICE AND COMPUTER READABLE STORAGE MEDIUM

CROSS-REFERENCE TO RELATED APPLICATIONS

This application is a continuation of application Ser. No. 09/625,982 filed on Jul. 26, 2000 now U.S. Pat. No. 6,823,389. The contents of application Ser. No. 09/625,982 are hereby incorporated herein by reference in their entirety.

BACKGROUND OF THE INVENTION

The present invention relates to a method, a system, and a recording medium to provide services in an online manner, and in particular, to a method, a system, and a recording medium to provide online services including a distributor device disposed between terminal equipment of users requesting services and a plurality of service points providing services for distributing the service requests of the users to the service points.

There has been broadly used a system in which a user accepts an online service of a financial institution via an automatic teller machine (ATM). Moreover, there is appearing a system in which a user accesses, from a personal computer (PC) which is installed in a place of a family or which is carried about as a portable unit, a service point of a financial institution to accept online services therefrom.

However, at present, the service points offer services in a time zone which matches with a time zone of on-duty hours of workers. This restricts the use of the system in holidays and at night.

According to the prior art above, there exists limitation with respect to the time zone of online services offered by the financial institution. The time zone cannot be regarded as sufficient for the user when compared with a service time zone of a convenience store or the like. Although the service time zone of the financial institution is going to be extended, it is difficult because of necessity of machine maintenance or the like that a single service point offers services for a long period of time, for example, 24 hours without interruption. Therefore, the users show a trend of use in which each user selects a service point convenient for the user from a plurality of service points having mutually different service time zones. However, it is troublesome for each user to search out an appropriate service point in consideration of business hours of the service points and to retrieve a line identifier number of a service point as a communication partner to input the number to her or his terminal equipment.

SUMMARY OF THE INVENTION

It is therefore an object of the present invention to construct an online service providing system in which the user can accept services offered, without paying attention to business hours and line identifier numbers of service points.

To achieve the object above according to the present invention, there is provided an online service providing system including terminal equipment of a user requesting a service, a computer installed at each of a plurality of service points offering services, and a distributor device intervening via a network between the terminal equipment and the computers to pass the service request from the terminal equipment to one of these computers. The distributor device includes first storage means for storing information regarding each user, second storage means for storing a service time zone of each service point, means for referencing, when a service request is received from a user, the first storage means and for determining whether or not the user is authorized to receive a service offered, means for referencing the second storage means and for selecting one of the service points currently in the service time zone, and means for relaying communication between the terminal equipment and the service point selected.

According to the present invention, there is provided a service providing method in which when a service request is received from an external device, one of a plurality of service points offering services is selected and the service request is transferred to the service point selected. The method includes the steps of storing a service time zone of each service point in storage means, referencing the storage means and selecting one of service points currently in a service time zone, and relaying the service request to the service point selected.

According to the present invention, there is provided a service providing method in which when a service request is received from terminal equipment, the service request is transferred to a service point offering services. The method includes the steps of storing, in storage means, a call identifier of each user associated with the terminal equipment and a service type available for the user with a correspondence established therebetween, determining the service type according to a call identifier received in association with a service request from the terminal equipment, and relaying the service request to a service point associated with the service type.

To achieve the object, there may be employed a program to implement the functions above or a recording media on which the program is stored.

BRIEF DESCRIPTION OF THE DRAWINGS

The present invention will be more apparent from the following detailed description, when taken in conjunction with the accompanying drawings, in which:

FIG. 3 is a diagram showing a data layout of access authorization level DB 16 of an embodiment according to the present invention;

FIG. 4 is a diagram showing a data layout of service point DB 17 of an embodiment according to the present invention;

FIG. 5 is a diagram showing a data layout of point operation status table 15 of an embodiment according to the present invention;

FIG. 6 is a diagram showing a data layout of history DB 18 of an embodiment according to the present invention;

DESCRIPTION OF THE EMBODIMENTS

Next, description will be given of an embodiment of the present invention by referring to the accompanying drawings.

Figure 1:
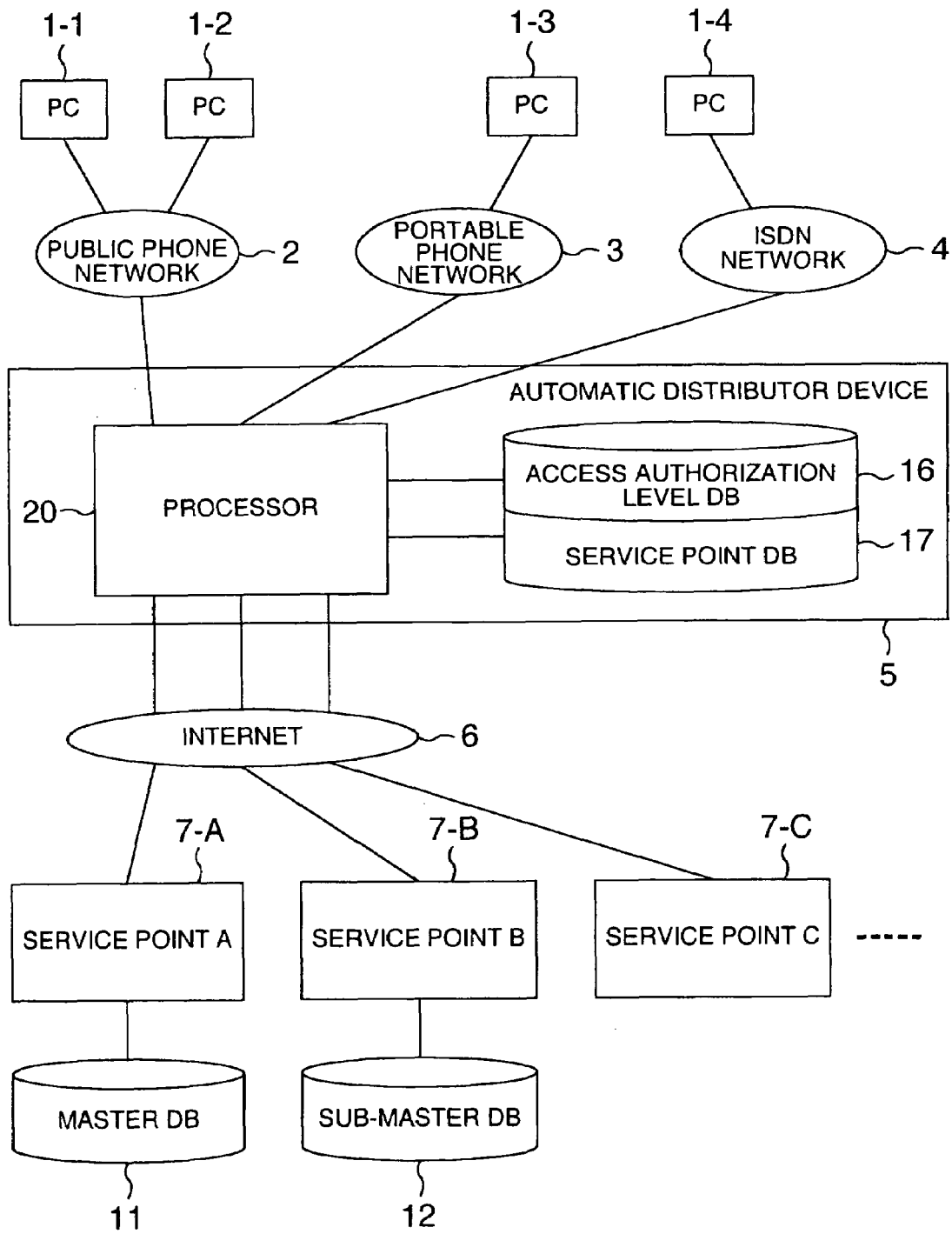
FIG. 1 is a diagram showing an overall system of an embodiment according to the present invention.

FIG. 1 is a configuration diagram of an overall system of the present embodiment. In conjunction with this embodiment, description will be given of a configuration and operation of a system to provide services for 24 hours. The system is implemented as an example of home banking which utilizes the world wide web (WWW).

The overall system includes a personal computer (PC) 1, an automatic distributor device 5, a service point 7, a public phone network 2, a portable phone network 3, and an ISDN network 4 to connect the PCs 1 to automatic distributor device 5, and an internet 6 to connect device 5 to service points 7. PC 1 is terminal equipment on a service requesting side. The terminal equipment need not necessarily be a general computer such as a PC, but may be a special purpose device such as an ATM. It is assumed in this example that PC 1-1 and PC 1-2 are connected to public phone network 2, PC 1-3 to portable phone network 3, and PC 1-4 to ISDN network 4. In the following description, when either one of PCs 1 is to be indicated, the pertinent device is referred to simply as PC 1.

Service point 7 is a point on a service offering side and actually includes as its entity a computer installed at the point. According to time zones of business hours and/or types of services offered, a plurality of service points are classified into service points 7-A, 7-B, 7-C, and the like. The respective service points may be installed worldwide. There is also included a master database (DB) 11 or a sub-master DB 12 which is connected to the computer of each service point and which is a database (DB) to be accessed when a service is offered. In the following description, when either one of service points 7 is to be indicated, the pertinent point is simply referred to as service point 7.

Automatic distributor device 5 is a computer which intervenes between PC 1 and service points 7. When a service request is received from PC 1, device 5 aids the service providing operation. Namely, device 5 selects pertinent service point 7 according to a business time zone and a type of service requested and then relays communication between PC1 having issued the request and service point 7 selected. The system further includes a service point DB 17 connected to a processor 20 of automatic distributor device 5. DB 17 stores the business time zone and the service type for each service point 7. Included in the system is also an access authorization level DB 16 connected to processor 20. DB 16 stores information regarding users and is used to determine whether or not a user issuing a service request from PC 1 is an authorized user. It is assumed in this embodiment that PC 1 and automatic distributor device 5 are receiving a call identifier notification service calling number display service of public phone network 2, portable phone network 3 and/or ISDN network 4 and hence can receive a call identifier of PC 1. However, any other method may be employed only if the call originator can be identified, for example, a user identifier is requested to be inputted for each use of the system.

Figure 2:
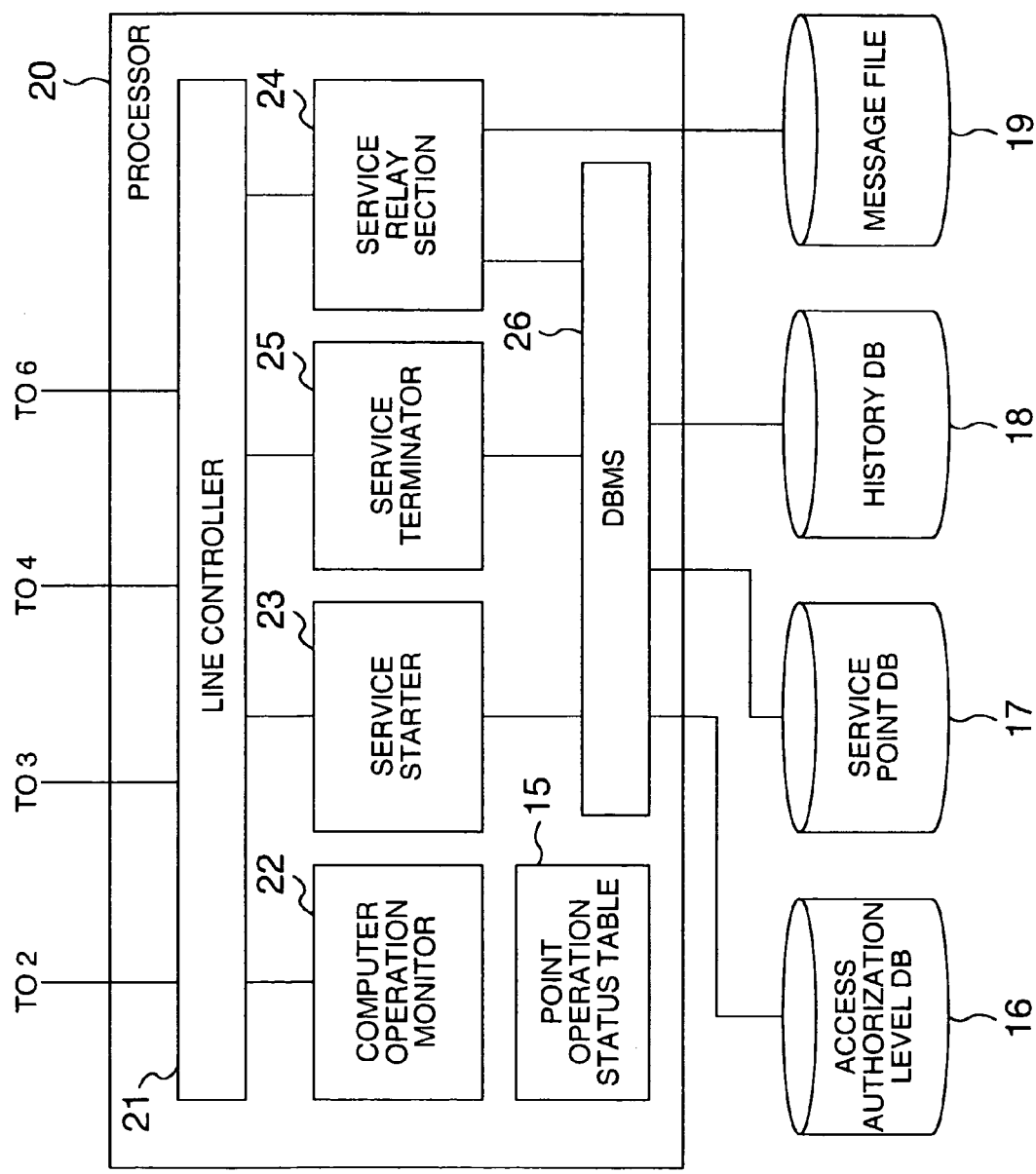
FIG. 2 is a diagram showing an internal configuration of automatic distributor device 5 of an embodiment according to the present invention.

FIG. 2 shows in a configuration diagram a configuration of automatic distributor device 5. Processor 20 of device 5 is connected to a storage to store access authorization level DB 16, service point DB 17, a history DB 18, and a message file 19. History DB 18 stores, according to a call from PC 1, history regarding a line connection time and a line disconnection time. Message file 19 stores various messages to be sent to PC 1.

Processor 20 includes a line controller 21. Controller 21 includes hardware/software to relay communication between PC 1 and service point 7. Specifically, controller 21 handles the call from PC 1 via public phone network 2, portable phone network 3 and ISDN network 4 as well as the call to service point 7. Processor 20 includes a memory including a point operation status table 15. Table 15 stores an operable/inoperable state indicating whether or not each service point 7 is operable.

The memory of processor 20 stores programs respectively of a computer operation monitor 22, a service starter 23, a service relay section 24, a service terminator 25, and a database management system (DBMS) 26. The processor 20 executes these programs. Monitor 22 periodically conducts a health check for the computer of each service point 7 and updates table 15 according to a result of the check.

Service starter 23 periodically monitors service point DB 17 and starts processing of any service point 7 reached the business time thereof. Service relay section 24 receives a service request from PC 1 and references access authorization level DB 16 to determine whether or not the user has a right to receive the service. If the user has been authorized, section 24 references table 15 and service point DB 17, selects pertinent service point 7 from operable service points according to the business time zone and the service type requested, and then starts to relay communication between PC1 having issued the request and service point 7 selected. Additionally, service relay section 24 acquires, when information of the users registered to access authorization level DB 16 is insufficient, a pertinent message from message file 19 and sends the message to PC 1 to provide an input guidance for user information. Moreover, section 24 records history regarding communication with PC 1 in history DB 18. Service terminator 25 periodically monitors service point DB 17 and selects service point which business time zone is ending. To relay updated data of the service type as an object of the 24-hour service to subsequent service point 7, section 25 instructs service point 7 currently in operation to transfer the updated data to subsequent service point 7.

The respective functions of automatic distributor device 5 can be provided also as software. For example, it is also possible to dispose a recording media to store a program of service relay section 24. The program is thereafter read into the memory of processor 20 via a driver connected to processor 20 or the program is transmitted via a driver connected to a second computer, the second processor, and a network to automatic distributor device 5 so as to be executed by processor 20.

Although the system above includes one automatic distributor device 5, a plurality of automatic distributor devices 5 may be arranged. In such a situation, by using a representative number service of public phone network 2, portable phone network 3, and ISDN network 4, either one of the devices 5 disposed in the system can be called to achieve the automatic distribution service. In this system, even when there appears automatic distributor device 5 which stops its service due to failure or maintenance, the automatic distribution service can be continuously achieved by another automatic distributor device 5.

FIG. 3 shows a data layout of access authorization level DB 16. In DB 16, each user record includes data items such as a call identifier 31, a user identifier 32, a registration flag 33, and an available service type code 34. Call identifier 31 is a number assigned to PC 1 and is sent via public phone network 2, portable phone network 3, or ISDN network 4 to automatic distributor device 5. User identifier 32 is an identifier to identify a user. User identifier 32 may include a code to specify service point 7 or a code to restrict a service type. Registration flag 33 is a flag to indicate whether or not a registering action of a call identifier has been conducted via public phone network 2, portable phone network 3, or ISDN network 4 to automatic distributor device 5. For flag 33, "1" indicates a state in which call identifier 31 has already been registered and hence the automatic distribution service is possible and "0" indicates a state in which call identifier 31 has not been yet registered and hence the automatic distribution service is impossible. Available service type code 34 indicates a code of a service type available by associated user identifier 32. It is also possible that one user has a plurality of user identifiers 32. Moreover, for one call identifier 31, there may exist a plurality of user records having respectively different user identifiers in access authorization level DB 16. Conversely, for one user identifier 32, there may exist a plurality of user records having mutually different call identifiers.

FIG. 4 shows a data layout of service point DB 17. In DB 17, a service point record disposed for each service point 7 includes data items such as a service point name 41, business hours 42, an available service type code 43, a transferable service type code 44, and a service point number 45. Service point name 41 is an identifier of pertinent service point 7. Business hours 42 indicate a business time zone of service point name 41. Available service type code 43 indicates a code of a service available in the business time zone. Transferable service type code 44 indicates a code of a service type as an object of a 24-hour continuous service for a plurality of service points 7 among available service type codes 43. However, it is assumed that master DB 11 used for the service of the service type indicated by transferable service type code 44 is master DB 11 of which data is updated in the online operation. Service point number 45 is a subscriber number used to issue a call via internet 6 to pertinent service point 7.

FIG. 5 shows a data layout of point operation status table 15. In table 15, an entry disposed for each service point 7 includes items such as a service point name 46, an operable flag 47, and an end flag 48. Service point name 46 is the same as service point name 41. Operable flag 47 stores "1" when the computer of pertinent service point 7 is in an operable state and "0" when the computer is inoperable due to failure or the like. End flag 48 is reset to "0" when the service is started and is set to "1" when a service is transferred to another service point 7 before the service is terminated.

FIG. 6 shows a data configuration of history DB 18. In DB 18, each history record includes data items such as a call identifier 51, a user identifier 52, a relay destination service point name 53, a relay connection start time 54, a relay connection end time 55, and time used 56. Call identifier 51 is the same as call identifier 31. User identifier 52 is the same as user identifier 32. Relay destination service point name 53 is a name of service point 7 as a relay destination. Relay connection start time 54 is a start time of relay connection, relay connection end time 55 is an end time of relay connection, and time used 56 is a difference between relay connection start time 54 and relay connection end time 55, namely, a period of time lapsed for the use of service point 7.

Figure 7A:
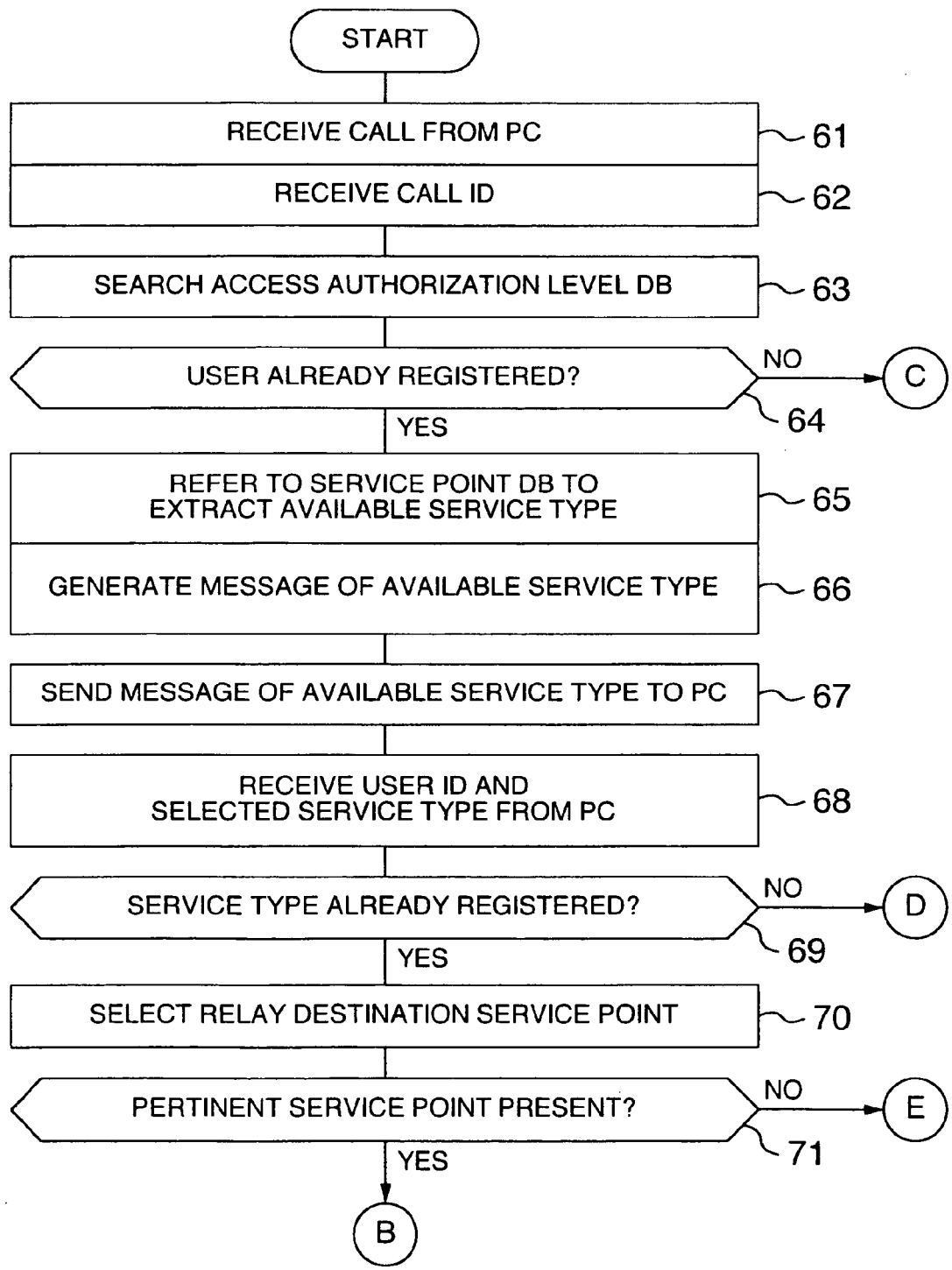
FIGS. 7A to 7E are flowcharts showing a processing flow of service relay section 24 of an embodiment according to the present invention.
Figure 7B:
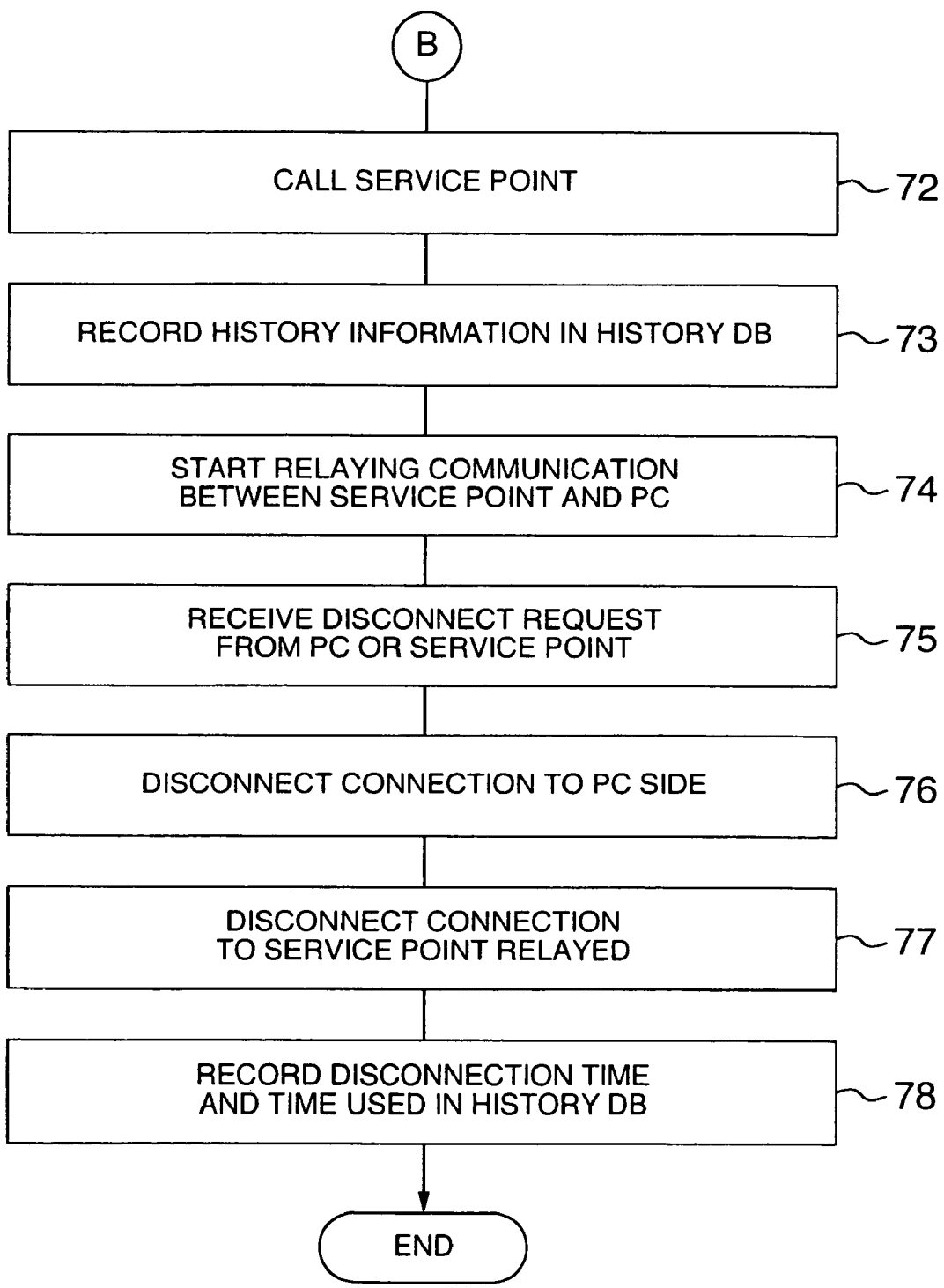

FIGS. 7A and 7B are flowcharts showing a processing flow of service relay section 24. Having received a call via line controller 21 from PC 1 (step 61), section 24 accepts notification of a call identifier of pertinent PC 1 via public phone network 2, portable phone network 3, or ISDN network 4 (step 62) and then grants the call termination of PC 1. If the call identifier is not notified from PC 1, section 24 rejects the call. Next, section 24 searches access authorization level DB 16 via DBM 26 using the received call identifier 31 (step 63) and obtains all user records concerned. If users with the same caller number have been registered to DB 16 (yes in step 64), section 24 refers to service point name 41, business hours 42, and available service type code 43 in service point DB 17 as well as service point name 45 and operable flag 47 in table 15 to extract therefrom all available service type codes 43 of service points 7 which are operable and which are currently in the business hours (step 65). Section 24 generates a message including a list of the available service types (step 66) and then sends the message to PC 1 from which section 24 has received the call via line controller 21 (step 67). It is also possible to achieve, in place of the execution of steps 65 and 66 for each received call from PC 1, an operation in which service point DB 17 and point operation status table 15 are periodically checked to generate a list of currently available service types to thereby update the list stored in message file 19. Thereafter, the list of currently available service types may be read from message file 19 and be sent to PC 1. The list of currently available service types is received by PC 1 and is displayed as a menu on the display of PC 1 such that the user selects one of the service types.

Having received from pertinent PC 1 the user identifier and the service type code selected (step 68), service relay section 24 compares these items respectively with user identifier 32 and service type code 34 in the user record obtained in step 63 and determines whether or not user identifier 32 results in a matching state and the service type code is contained in service type code 34, that is, the user's service type has already been registered (step 69). If the service type has been registered (yes in step 69), section 24 refers to service point DB 17 to select one of the service points 7 which offer the service of the selected service type and which are selected as the service points 7 currently in operation (step 70). In a situation in which a plurality of service points offer the service of the same service type and in which a service point 7 is specified by a user identifier, the specified service point 7 is determined. If the service point offering the service is not related to the user identifier, it is only necessary to select an arbitrary service point and hence the relay destination service point need only be determined to appropriately distribute the load among the service points 7.

If there exists pertinent service point 7 as a result of the processing of selection in step 70 (yes in step 71), processing goes to FIG. 7B in which section 24 refers to service point DB 17 to acquire service point number 45 of service point 7 and then calls the service point 7 via line controller 21 and internet 6 (step 72). Next, section 24 records call identifier 51, user identifier 52, relay destination service point name 53, and relay connection start time 54 of the user in history DB 18 (step 73). Subsequently, section 24 starts the relaying operation so that pertinent PC 1 communicates via line controller 21 with relay destination service point 7 (step 74). Having received a disconnect request from the PC 1 or relay destination service point 7 (step 75), section 24 disconnects the connection between PC 1 and automatic distributor device 5 (step 76) and then disconnects the connection between relay destination service point 7 and automatic distributor device 5 (step 77). Finally, section 24 records relay connection end time 55 and time used 56 in a history record of the user in history DB 18.

Figure 7C:
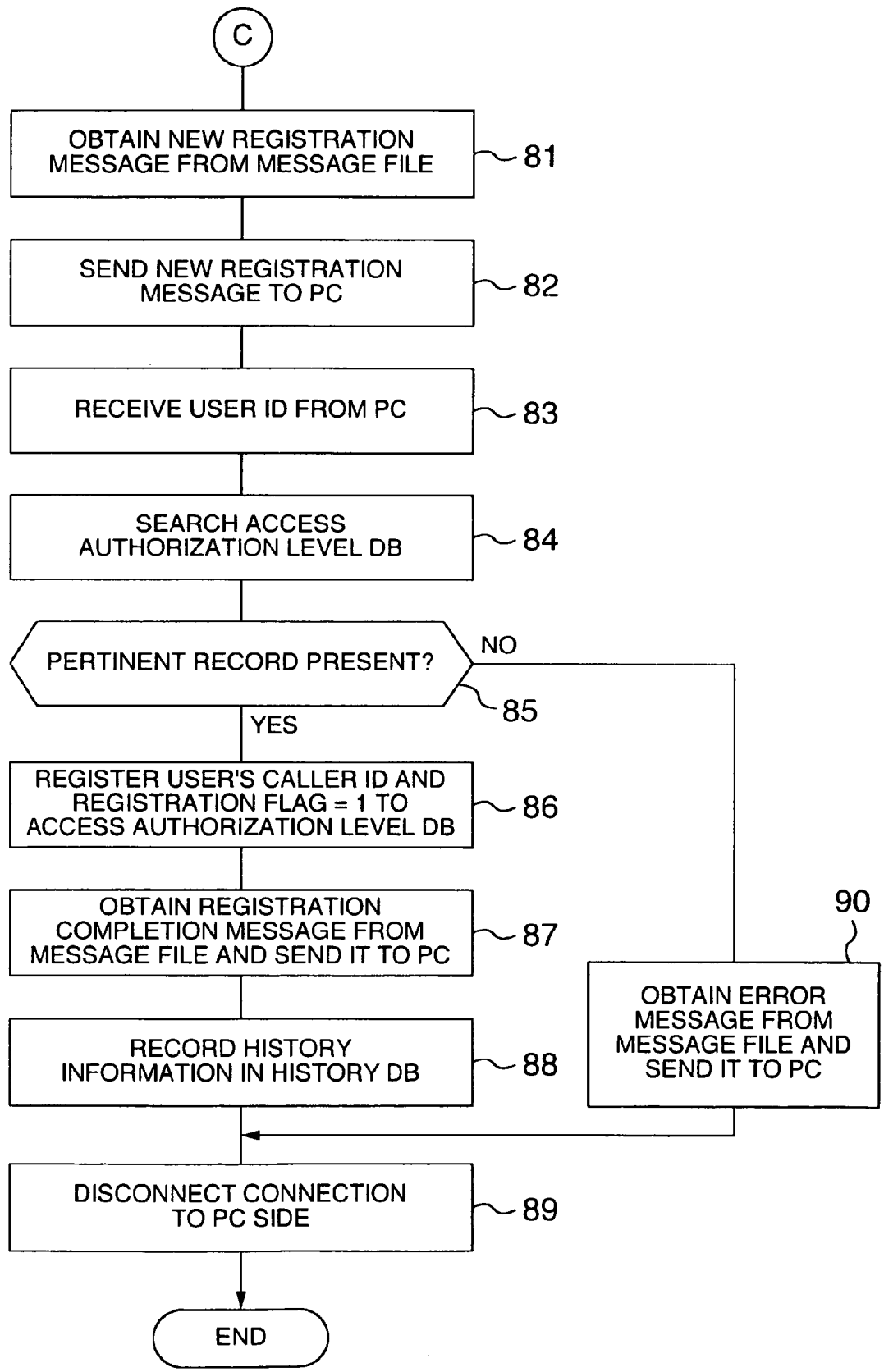

If call identifier 31 of the user has not been registered to access authorization level DB 16 (no in step 64), processing goes to FIG. 7C in which service relay section 24 acquires a new registration message from message file 19 (step 81) and sends the message to pertinent PC 1 (step 82). Having received the new registration message, PC 1 displays a screen image of the message on its display. When a user identifier is inputted from the user, PC 1 sends the user identifier to automatic distributor device 5. Having received the user identifier from PC 1 (step 83), section 24 searches access authorization level DB 16 using user identifier 32 as a key (step 84). If a pertinent user record exists (yes in step 85), section 24 registers call identifier 31 already received and registration flag 33 set to "1" to a record of the user in DB 16 (step 86). It is assumed in this case that if the user is authorized, a record of the user having user identifier 32 includes a registration flag set to "0" indicating that the registration has been completed in DB 16. In a situation in which although a user record having the specified user identifier exists in access authorization level DB 16 and in which another call identifier has already been stored as a caller identifier 31, there is produced a user record including call identifier 31 received as a new item, specified user identifier 32, and registration flag=1 and the record is then added to DB 16. Section 24 then acquires a message indicating completion of the registration from message file 19 and sends the message to pertinent PC 1 (step 87). Next, section 24 stores in history DB 18 a history record including call identifier 51, user identifier 52, relay connection start time 54, and relay connection end time 55 (step 88). Section 24 then disconnects connection between pertinent PC 1 and automatic distributor device 5 via line controller 21 (step 89). If a pertinent user record is absent in access authorization level DB 16 (no in step 85), section 24 obtains an error message from message file 19, transmits the message to pertinent PC 1 (step 90), and then passes control to step 89.

Figure 7D:
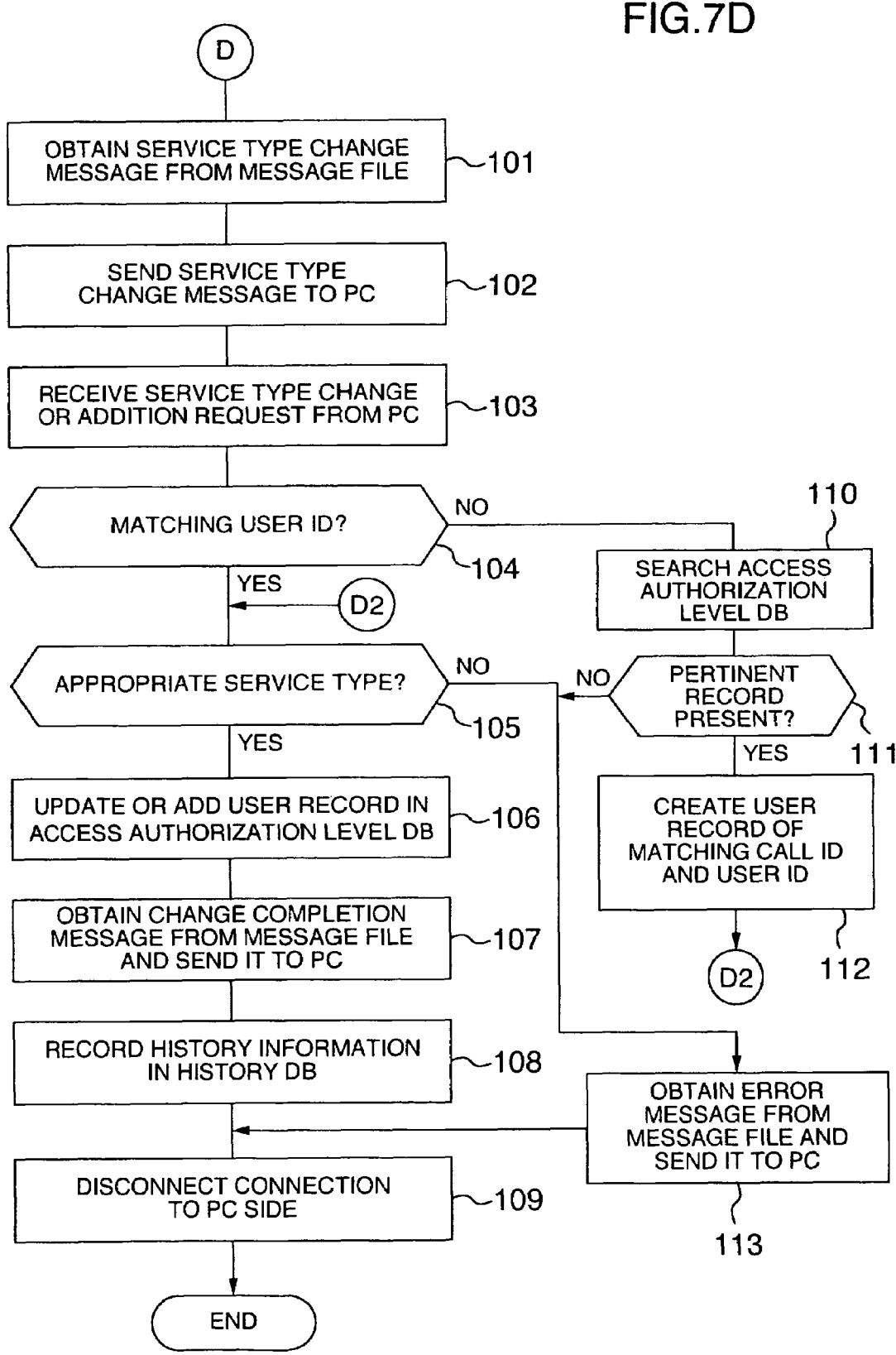

If the user identifier sent from PC 1 or the specified service type has not been registered to the user record obtained in step 63 (no in step 69), processing goes to FIG. 7D in which service relay section 24 obtains a service type change message from message file 19 (step 101) and sends the message to pertinent PC 1 (step 102). Having received the service type change message, PC 1 displays a screen thereof on its display. When the user instructs a service type change or addition request or when a service type already inputted is confirmed, PC 1 transmits the service type changed, added, or confirmed to automatic distributor device 5. When the service type change or addition is received from PC 1 (step 103), section 24 determines, if the user identifier received before matches user identifier in the obtained user record (yes in step 104), whether or not the service type received is appropriate (step 105). If the user identifier received before includes a constituent information item to restrict the service type, section 24 can determine whether or not the user identifier matches with the service type requested. If the service type is appropriate (yes in step 105), section 24 changes or adds available service type code 34 in the user record obtained and updates a pertinent record in access authorization level DB 16 (step 106). Subsequently, service relay section 24 acquires a service type change completion message from message file 19 and sends the message to pertinent PC 1 (step 107). Next, section 24 stores a history record including call identifier 51, user identifier 52, relay connection start time 54, and relay connection end time 55 in history DB 18 (step 108) and then disconnects connection between PC 1 and automatic distributor device 5 (step 109).

If the user identifier received before mismatches user identifier 32 in the user record (no in step 104), section 24 searches access authorization level DB 16 by setting the user identifier before received as a key (step 110). If a pertinent user record is present (yes in step 111), section 24 creates a user record in which the call identifier before received is set as call identifier 31, the user identifier received before is set as user identifier 32, and the registration flag is set to one. Section 24 replaces the user record obtained in step 63 with the user record created and passes control to step 105. If the received service type is appropriate (yes in step 105), section 24 changes or adds user service type code 34 of the new user record created and then adds the record to access authorization level DB 16 (step 106). If call identifier 31 of the user record obtained in step 110 has not been registered, section 24 may store the before received call identifier in call identifier 31 of the user record to update DB 16 with the user record having resultant available service type code 34.

If the service type received is inappropriate (no in step 105) or a record having the user identifier received is absent in DB 16 (no in step 111), section 24 reads an error message from message file 19 and sends it to pertinent PC 1 (step 113) and then transfers control to step 109.

Figure 7E:
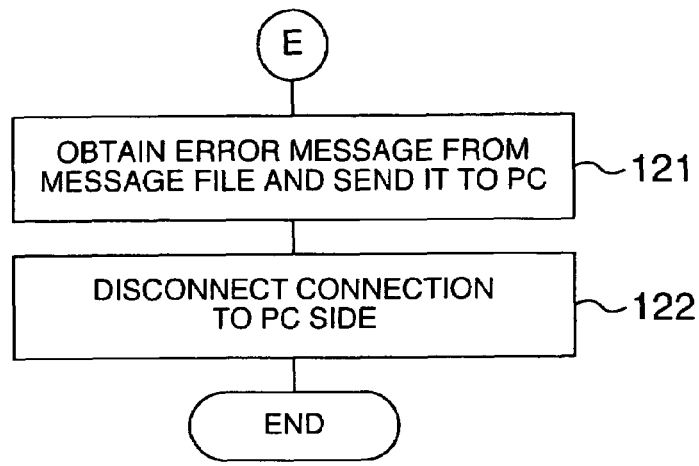

If pertinent service point 7 is absent as a result of the selection in step 70 (no in step 71), processing goes to FIG. 7E in which section 24 acquires from message file 19 an error message indicating absence of the pertinent service point and sends it to pertinent PC 1 (step 121). Section 24 then disconnects connection between PC 1 and automatic distributor device 5 (step 122).

Figure 8:
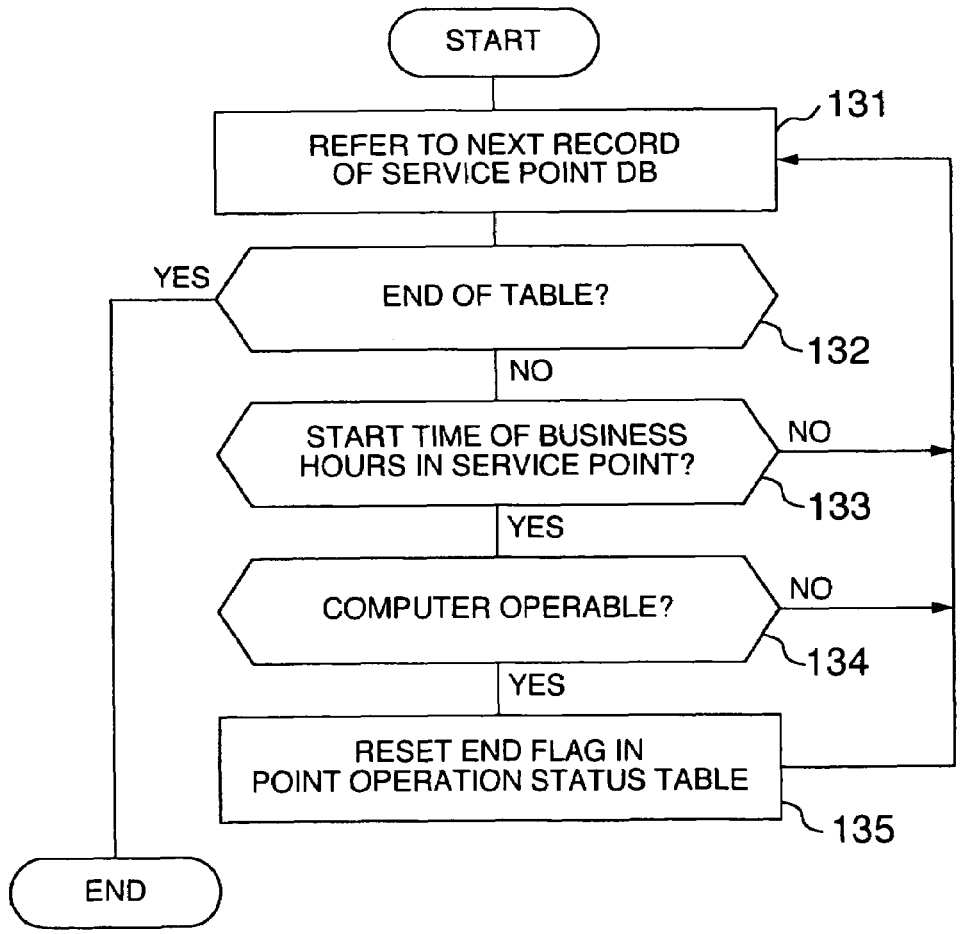
FIG. 8 is a flowchart showing a processing flow of service starter 23 of an embodiment according to the present invention.

FIG. 8 is a flowchart showing a processing flow of service starter 23. Service starter 23 is periodically executed. Starter 23 refers to a subsequent service point record in service point DB 17 (step 131). If it is not the end of table (no in step 132), starter 23 compares the current time with a start time of business hours 42. If the current time is after the start time of business hours in pertinent service point 7 (yes in step 133), starter 23 refers to point operation status table 15. If operable flag 47 of service point 7 is set and the computer of the point is operable (yes in step 134), starter 23 resets end flag 48 of pertinent service point 7 in status table 15 (step 135) and returns to step 131. If the current time is before the start time of business hours 42 (no in step 133) or if the computer is inoperable (no in step 134), starter 23 returns to step 131. When it is the end of service point DB 17 (yes in step 132), starter 23 terminates the processing.

Figure 9:
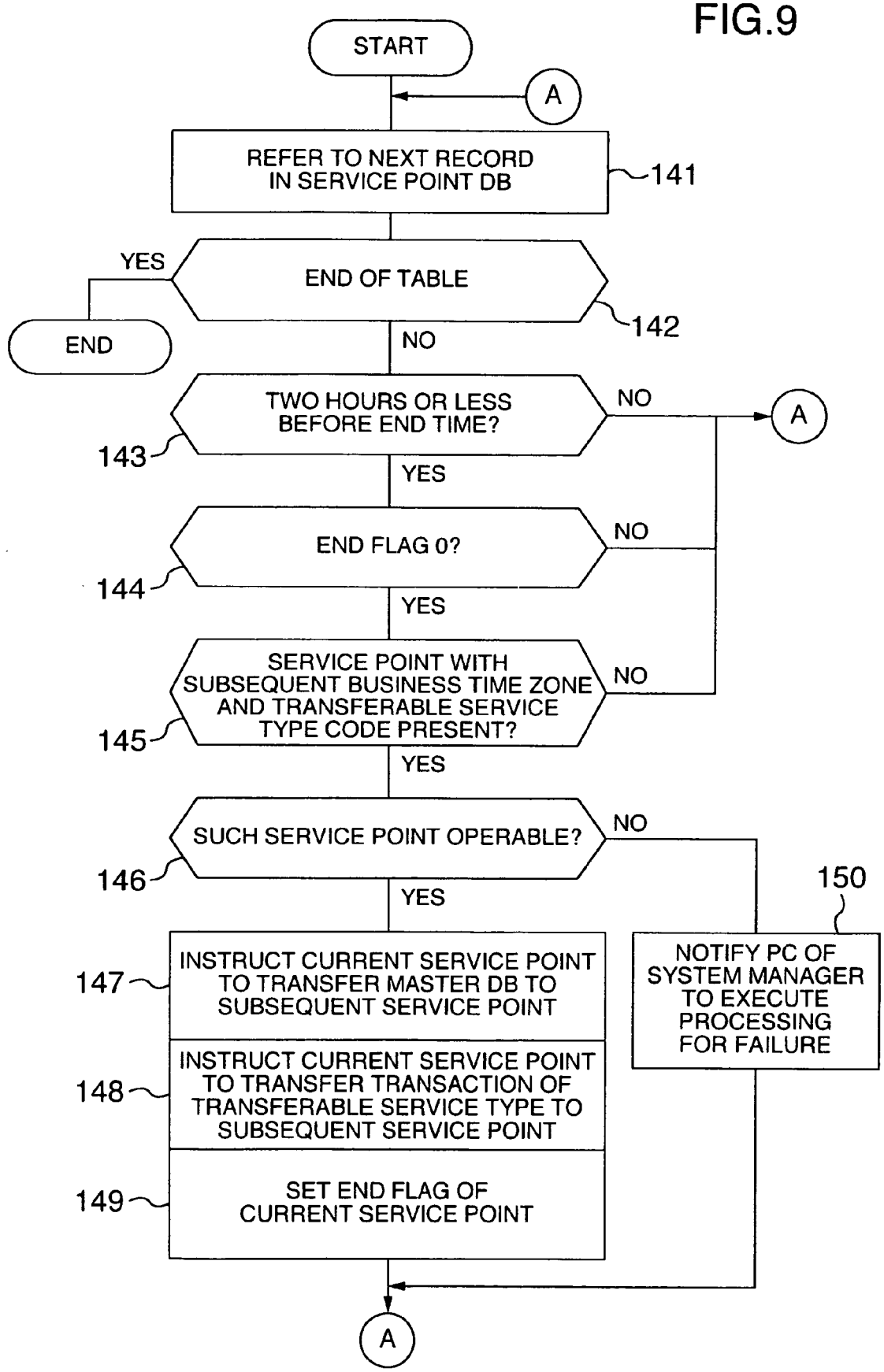
FIG. 9 is a flowchart showing a processing flow of service terminator 25 of an embodiment according to the present invention.

FIG. 9 is a flowchart showing a processing flow of service terminator 25. Service terminator 25 is periodically executed. Terminator 25 refers to a next service point record in service point DB 17 (step 141). If it is not the end of table (no in step 142), terminator 25 compares the current time with the end time of business hours 42. If the current time is within two hours of the business end time (yes in step 143), terminator 25 refers to point operation status table 15. If end flag 48 of service point 7 is zero (yes in step 144), terminator 25 searches service point DB 17 to determine whether or not there exists subsequent service point 7 having a service type corresponding to transferable service type code 44 of the pertinent service point record and a start time of business hours 42 succeeds the end time therein (step 145). If such service point 7 is present (yes in step 145), terminator 25 refers to point operation status table 15 to determine whether or not operable flag 47 of pertinent service point 7 is on (1; step 146). If service point 7 is operable, terminator 25 instructs current service point 7 to transfer, via line controller 21 and internet 6 to subsequent service point 7, updated data regarding a service type indicated by transferable service type code 44 of master DB 11 (step 147). Next, terminator 25 instructs current service point 7 to transfer a transaction of a transferable service type to subsequent service point 7 (step 148). Finally, terminator 25 sets termination flag 48 of current service point 7 to one (step 149) and then returns to step 141.

Assume, for example, that current service point 7 is service point 7-A. Using service point DB 17 shown in FIG. 4, transferable service type code 44 is obtained as 12. Service point 7 which has a business time zone subsequent to that of service point 7-A and which has same transferable service type code 44 is service point 7-B. In this situation, if a database regarding a service type indicated by transferable service type code 44 is to be updated, data of master DB 11 regarding the service type must be transferred to service point 7-B to be stored in sub-master DB 12 before the start of service in service point 7-B. Since a transfer instruction of master DB 11 is issued to service point 7-A in step 147, service point 7-A reads updated data regarding the service type from master DB 11 and sends the data via internet 6 to service point 7-B. Service point 7-B receives the data and updates sub-master DB 12 accordingly. Since a transfer instruction of a transaction regarding the service type is issued to service point 7-A in step 148, service point 7-A updates master DB 11 using a transaction received and sends the transaction also to service point 7-B. That is, the updated data is transferred to service point 7-B by a point of time at least two hours before the end of business hours, and data to be updated within two hours of end of business hours is sent to service point 7-B in a transaction format to update the data. Service point 7-B updates sub-master DB 12 with data received from service point 7-A and stores a transaction received from service point 7-A in a buffer queue. When the data transfer from service point 7-A to service point 7-B is finished and sub-master DB 12 is updated, sub-master DB is updated using the transaction stored in the buffer queue. In this case, it is assumed that the processing is completely finished within two hours in service point 7-B. The time limit may be changed flexibly. Therefore, at time 16:00 which is the business end time of service point 7-A and which is the business start time of service point 7-B, master DB 11 and sub-master DB 12 must be logically equal in their contents regarding the transferable service type. At the business start time of service point 7-B, master DB 11 is replaced with sub-master DB 12.

The unit to process steps 147 and 148 is not limited to automatic distributor device 5. Each service point 7 may monitor time to autonomously transfer the master DB and the transaction or a device other than automatic distributor device 5 may send the instructions of steps 147 and 148 to service point 7.

Returning to description of FIG. 9, control is passed to step 141 in either one of the cases: the time of pertinent service point 7 is not within two hours of the business end time (no in step 143), end flag 48 of pertinent service point 7 is one (no in step 144), transferable service type code 44 is absent in the service point record, and a subsequent service point 7 having same transferable service type code 44 is absent (no in step 145).

If service point 7 of the subsequent business time zone having the same transferable service type is inoperable (no in step 146), terminator 25 notifies the condition to PC 1 operated by the system manager and executes processing for failure of the computer in service point 7 (step 150).

There is required exception processing for failure. For example, terminator 25 stops the service in the subsequent business time zone in which the service of the transferable service type is offered. Terminator then transfers the contents of master DB at termination of the current business time zone to service point 7 having a subsequent business time zone to load a database with the contents.

According to the embodiment, automatic distributor device 5 conducts an automatic distribution service to service point 7 only under the conditions as follows. Namely, user identifier 32 is beforehand registered to access authorization level DB 16, call identifier 31 of PC 1 is registered, a user record includes call identifier 31 and user identifier 32, and these items match the call identifier and the user identifier sent from PC 1. Therefore, a service request from PC 1 not satisfying the condition can be rejected. In consideration of convenience of the user on one hand, a combination of call identifier 31 and user identifier 32 is not fixed, but can be freely changed. This usability has a weak point on the other hand. Namely, it is possible that a first person uses user identifier 32 of a second person to accept a service from service point 7 in an illegal manner. Automatic distributor device 5 of the embodiment records call identifier 31 and user identifier 32 of a user in history DB 18, and hence it is possible to trace such an illegal use according to the information recorded. Although the communication networks to connect PC 1 to automatic distributor device 5 are public phone network 2, portable phone network 3, and ISDN network 4 in the embodiment, the present invention can be achieved by using the internet in place thereof and an MAC address and an internet IP address in place of the call identifier.

In accordance with the embodiment, in response to a service request from PC 1, automatic distributor device 5 references service point DB 17 to select operable service point 7 according to business hours 42 and available service type code 43. Consequently, the user need not pay attention to the business time zone of each service point. Furthermore, a 24-hour service is possible by disposing business time zones of a plurality of shifts. In addition, the contents of service point DB 17 can be changed from PC 1 of the system manager at occurrence of failure of the computer in service point 7, according to a state of load on the computer in service point 7, and/or in response to changes in the operation schedule for urgent maintenance.

Although the embodiment has been described in an example of a home banking system, the present invention is also applicable to other service jobs such as a 24-hour service in which a long-period service is offered. The present invention may be applied to, for example, an after-service job for consultation after users have bought items such as a personal computer and/or a household appliance. In this situation, a production number of the item may be used in place of user identifier 32. The user service may be classified type in this situation into an operation method enquiry, a failure enquiry, and an enquiry for parts and options.

In accordance with the present invention described above, the automatic distributor device references a service time zone of each service point stored in a storage to select an available service point and transfers a service request of the user to a pertinent service point. The user can therefore accept a desired online service only by communicating with the automatic distributor device without paying attention to the service time zone of the service point and without inputting a line identifier number of the service point. On the other hand, the service point side does not require any distributing operator. The service point can advantageously save human power and can offer services at a high speed.

While the present invention has been described in detail and pictorially in the accompanying drawings, it is not limited to such details since many changes and modifications recognizable to those of ordinary skill in the art may be made to the invention without departing from the spirit and scope thereof.

What is claimed is:

1. An online service providing method performed by a distributor device intervening, via a network, between a terminal equipment of a user requesting a service and computers installed at a plurality of service points offering services, said method comprising:
    storing, in first storage means, information regarding each user;
    storing, in second storage means, a service time zone of each service point;
    determining whether the user is authorized to receive a service offered by referring to the first storage means, when a service request is received from a user;
    when the user is authorized, selecting one of the service points currently in the service time zone by referring to the second storage means; and
    relaying communication between the terminal equipment and the selected service point.

2. A service distributor device for selecting one of a plurality of service points offering services in response to a service request from external and relaying a service, comprising:
    storage means for storing a service time zone of each service point;
    means for selecting one of the service points currently in the service time zone by referring to the storage means; and
    means for relaying the service request to the selected service point.

3. A service distributor device according to claim 2, wherein service time zones of a plurality of service points allow a 24-hour continuous service.

4. A service distributor device according to claim 2, further comprising:
    second storage means for registering a call identifier of each user;
    control means for controlling to relay the service request to the selected service point, when a number of a sender of the server request coincides with the call identifier included in the second storage means.

5. A service distributor device according to claim 2, wherein:
    the storage means further stores a service type of each service point, and
    the selecting means selects one of the service points matching a service type requested by the service request in addition to being in the service time zone by referring to the storage means.

6. A service distributor device according to claim 2, wherein when a service time zone of a first service point directly succeeds a service time zone of a second service point, the first service point transfers data updated by the first service point and a transaction received by the first service point to the second service point before the service of the first service point is switched to the service of the second service point.

7. A service distributor device for relaying a service offered by a service point when a service request is received from a terminal equipment, comprising:
    storing means for storing a call identifier of each user associated with the terminal equipment and a service type available for the user with a correspondence established therebetween;
    determining means for determining the service type according to a call identifier of the service request from the terminal equipment; and
    relaying means for relaying the service request to a service point associated with the service type.

* * * * *